United States Patent
Wyld et al.

(10) Patent No.: US 10,275,341 B2
(45) Date of Patent: Apr. 30, 2019

(54) MOBILE APPLICATION USABILITY TESTING

(71) Applicant: Somo Innovations Ltd, London (GB)

(72) Inventors: Andrew Wyld, London (GB); Allistair Crossley, London (GB)

(73) Assignee: Somo Innovations Ltd, London (GB)

( * ) Notice: Subject to any disclaimer, the term of this patent is extended or adjusted under 35 U.S.C. 154(b) by 174 days.

(21) Appl. No.: 15/003,637

(22) Filed: Jan. 21, 2016

(65) Prior Publication Data

US 2016/0210222 A1 Jul. 21, 2016

Related U.S. Application Data

(60) Provisional application No. 62/106,165, filed on Jan. 21, 2015.

(51) Int. Cl.
*G06F 9/44* (2018.01)
*G06F 11/36* (2006.01)
(Continued)

(52) U.S. Cl.
CPC ...... *G06F 11/3672* (2013.01); *G06F 11/3438* (2013.01); *H04W 4/60* (2018.02); *G06F 11/3476* (2013.01)

(58) Field of Classification Search
CPC ..... H04N 7/183; G06F 11/34; G06F 11/3438; G06F 11/3476; G06F 11/3672; H04W 4/60

See application file for complete search history.

(56) References Cited

U.S. PATENT DOCUMENTS 6,526,526 B1 * 2/2003 Dong .................. G06F 11/3438
714/46
9,208,063 B1 * 12/2015 Sisinni .................. G06F 11/368
(Continued)

FOREIGN PATENT DOCUMENTS

EP 1914634 A1 * 4/2008 ............... G06F 6/34

OTHER PUBLICATIONS

Steven Bohez et al., "Management of crowdsourced first-person video: Street View Live", [Online], 2014, pp. 1-9, [Retrieved from Internet on Sep. 14, 2017], <https://biblio.ugent.be/publication/5871428/file/5871429.pdf>.*

(Continued)

*Primary Examiner* — Ziaul A Chowdhury
(74) *Attorney, Agent, or Firm* — Kilpatrick Townsend & Stockton LLP

(57) ABSTRACT

Systems and methods are described for usability testing of mobile applications on mobile devices. A usability test may be performed without the need for a usability lab environment or external recording devices, since usability software may be run on the mobile device of a user. The usability test may be associated with tasks that the user may be requested to complete. While the tasks are being performed, usability data can be gathered. Such usability data may be recorded by recording functions of the mobile device, where the recording functions may be associated with sensors of the mobile device. This enables usability testing that better simulates real conditions under which a user may typically utilize the mobile application and is more cost effective.

18 Claims, 9 Drawing Sheets

(51) Int. Cl.
*G06F 11/34* (2006.01)
*H04W 4/60* (2018.01)

(56) References Cited

U.S. PATENT DOCUMENTS

| | | | | |
|---|---|---|---|---|
| 2005/0114798 | A1* | 5/2005 | Jiang | G06F 17/30876 715/864 |
| 2005/0254775 | A1 | 11/2005 | Hamilton et al. | |
| 2007/0073717 | A1* | 3/2007 | Ramer | G06F 17/30864 |
| 2008/0186276 | A1* | 8/2008 | Mayer-Ullmann | G06F 9/4443 345/158 |
| 2010/0161506 | A1* | 6/2010 | Bosenick | G06Q 30/02 705/347 |
| 2011/0185231 | A1* | 7/2011 | Balestrieri | G06F 11/3672 714/27 |
| 2012/0005582 | A1* | 1/2012 | Webber | G06F 11/3476 715/736 |
| 2012/0072481 | A1* | 3/2012 | Nandlall | G06F 9/5027 709/203 |
| 2012/0130702 | A1* | 5/2012 | Citron | G06F 11/3672 703/22 |
| 2012/0218396 | A1* | 8/2012 | Benatar | H04N 7/183 348/77 |
| 2013/0086999 | A1* | 4/2013 | Pitkanen | G06F 11/3438 73/865.8 |
| 2013/0303111 | A1* | 11/2013 | Marshall | H04W 4/14 455/405 |
| 2013/0305101 | A1* | 11/2013 | Gupta | G06F 21/56 714/47.3 |
| 2014/0137054 | A1* | 5/2014 | Gandhi | G06F 3/013 715/865 |
| 2014/0223441 | A1* | 8/2014 | Banda | G06F 9/48 718/102 |
| 2015/0304369 | A1* | 10/2015 | Sandholm | G06Q 10/10 715/753 |
| 2016/0283356 | A1* | 9/2016 | Waldman | G06F 11/3672 |
| 2017/0093671 | A1* | 3/2017 | Bank | H04W 48/18 |

OTHER PUBLICATIONS

Xiamoxiao Ma, "Famulus—an Automated Usability Testing System for Mobile Application", [Online], May 2014, pp. 1-8, [Retrieved from Internet on Sep. 14, 2017], <https://search.proquest.com/openview/78a8ba2fa2d5f9ebb522244d6044e803/1?pq-origsite=gscholar&cbl=18750&diss=y>.*

Huakun Liang et al., "A Remote Usability Testing Platform for Mobile Phones", [Online], 2011, pp. 312-316, [Retrieved from Internet on Sep. 14, 2017], <http://ieeexplore.ieee.org/stamp/stamp.jsp?arnumber=5952477>.*

Rudy Schusteritsch et al., "Towards the Perfect Infrastructure for Usability Testing on Mobile Devices", [Online], 2007, pp. 1839-1844, [Retrieved from Internet on Dec. 8, 2018], <http://delivery.acm.org/10.1145/1250000/1240908/p1839-schusteritsch.pdf> (Year: 2007).*

Virpi Roto et al., "Examining Mobile Phone Use in The Wild With Quasi-Experimentation", [Online], 2004, pp. 1-19, [Retrieved from Internet on Dec. 8, 2018], <https://pdfs.sennanticscholar.org/5a69/ecbf5d4db8d7e2f0001f92cc0e4e0b4ca428.pdf> (Year: 2004).*

* cited by examiner

MOBILE APPLICATION USABILITY TESTING

CROSS-REFERENCES TO RELATED APPLICATIONS

The present application claims priority from and is a non-provisional application of U.S. Provisional Application No. 62/106,165, entitled "Mobile Application Usability Testing," filed Jan. 21, 2015, the entire contents of which are herein incorporated by reference for all purposes.

FIELD

The present disclosure relates to systems and methods for usability testing of software applications on mobile devices.

BACKGROUND

Products are sometimes tested on users through a technique used in user-centered interaction design called "usability testing." In the industry, this testing is often viewed as an irreplaceable method of gaining direct input on how real users use software, and is therefore considered a near-mandatory practice that must be completed in order to release truly optimized products. The reasoning for giving such importance to usability testing is that without knowing how users use the software, the software's interactive elements cannot be accurately tailored to them to carry out the software's ultimate purpose in the most efficient and convenient way.

The most widely used method of usability testing on mobile device software applications in the prior art is to conduct the testing in professional usability labs. Test users are invited to these facilities, where they carry out the test actions on mobile devices that are mounted in place. Cameras and software are used to record information during the testing that could be later analyzed to improve the user experience during further development.

However, there are multiple problems with carrying out usability testing on mobile devices in usability lab facilities. First, they can be very expensive; it is not unusual for it to cost $50,000-70,000 to conduct usability testing in a lab, as the providers need to cover the cost of their rent, equipment, employee payroll, etc. The result of this high cost is that software developers will either do limited rounds of usability testing, ignore bad test results, or forego the process altogether. The cost of usability testing in a lab discourages developers from completing a fully iterative process of testing and developing until the software is really optimized; the result is that many mobile software applications are deployed prematurely.

Another problem with usability testing in a lab is that the lab conditions are far from the real-world conditions in which users would be using the software on their mobile device. The sterile and uncomfortable environment presented by the fixed mounts on the mobile devices, the external recording devices, and the general hassle of getting to and from the lab all have an undue influence on the user; these environmental factors make the user experience that is recorded in the lab not actually genuine in comparison to what would be seen in real world conditions. Because usability labs by definition do not allow users to use the software on their mobile devices as they would outside of testing conditions (e.g. sitting in a café or lying on the couch), the utility of usability lab test results are limited.

Therefore, it is desirable to provide systems and methods of usability testing for mobile software that can be conducted in real-world conditions at a relatively low cost in comparison to what is generally encountered with usability testing in usability lab facilities.

SUMMARY

Embodiments of the present invention provide systems and methods for usability testing on a mobile device. Certain embodiments of the present invention can package the technology necessary to record usability data into one or more forms that may be run on the user's own mobile device in real-world conditions, at relatively low cost. In one embodiment, usability testing functionality is packaged into an SDK (software developer's kit), where the usability testing functionality may be included in a software application's source code. The SDK may capture and compile certain data relevant to usability so that it can be analyzed to determine the usability of the software application.

According to one embodiment of the invention, a method may be performed by a mobile device having one or more processors executing an application that includes a usability library, where the user library including a central controller and one or more recording functions. The mobile device can receive, at the central controller, a first indicator of a start of a session for recording user interactions with the application. In some cases, the first indicator can be a user selection of an element on a user interface of the display. Further, the mobile device can send, from the central controller to the one or more recording functions, a command to begin recording. The mobile device can then capture, by the one or more recording functions, data from one or more sensors of the mobile device. Each recording functions may be associated with a different sensor, wherein the one or more sensors may include at least one from the group of: a camera, a screen capture device, a touch sensor of a display of the mobile device, and a microphone. The mobile device can then receive, at the central controller, a second indicator of a stop of the session.

Subsequently, the mobile device can combine the recorded data into a session output and can send the session output from the mobile device to a server. In some embodiments, the session output can be a video file comprising a plurality of video frames, where the plurality of video frames associated with a plurality of timestamps.

In some cases, combining the recorded data into the session output can include writing a plurality of screenshots of the display to the plurality of video frames, where the plurality of screenshots of the display can be associated with the plurality of timestamps. In some implementations, combining the recorded data into the session output can include placing visual indicators corresponding to touch events conducted by the user on the plurality of screenshots of the display, where the touch events can be associated with the plurality of timestamps.

In some embodiments, combining the recorded data into the session output can include writing images taken by the camera to the plurality of video frames, where the images can be associated with the plurality of timestamps. The camera may be pointed in the front-facing direction towards the user's face. In some cases, eye-tracking information can be determined from the images.

In some embodiments, combining the recorded data into the session output can include synchronizing audio data with the plurality of video frames based on the plurality of timestamps. In some cases, the synchronized data can be stored into the video file.

In some embodiments, the mobile device can further provide a task to the user of the mobile device, wherein the session may occur while the task is being performed. In some cases, the task can be provided to the user in response to a selection of an action performed in the application by the user.

Other embodiments are directed to systems, portable consumer devices, mobile devices, computers, and computer readable media associated with methods described herein.

A better understanding of the nature and advantages of embodiments of the present invention may be gained with reference to the following detailed description and the accompanying drawings.

DETAILED DESCRIPTION

Figure 1:
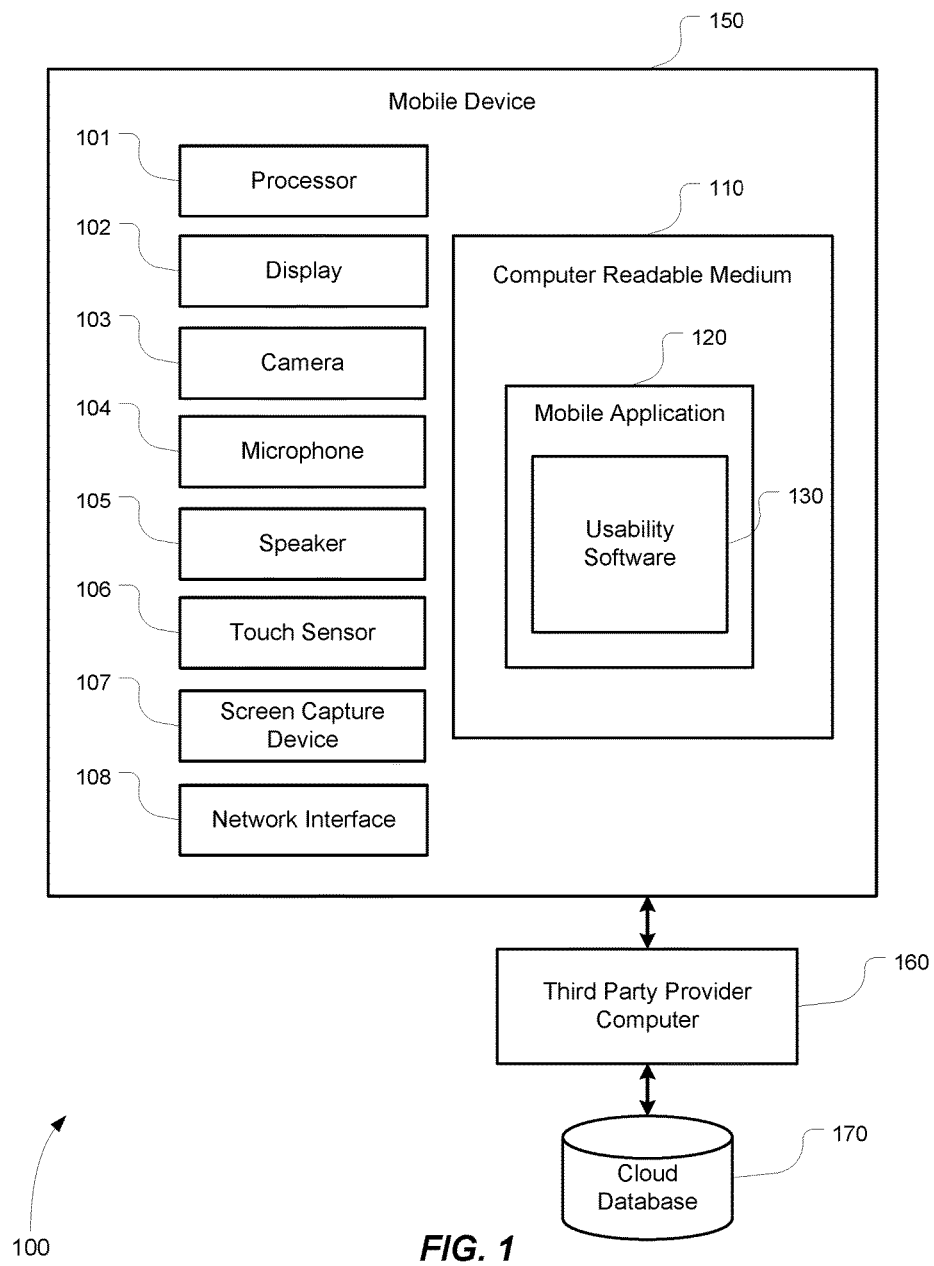
FIG. 1 shows a block diagram of the architecture of a system for usability testing according to embodiments of the present invention.

Conventionally, usability testing tools are meant to be utilizing in controlled environments, which can be restricting. For example, usability testing of a software application on a device is typically conducted in a lab environment. There are various reasons why such testing conditions may not be effective. First, the lab environment may be sterile and uncomfortable for the user when surrounded by monitoring devices and recording devices. Additionally, the general hassle of getting to and from the lab location may also have some influence on the user. These environmental factors may serve as unusual stimuli that can make the user experience that is recorded in the lab environment not genuine in comparison to the user experience in real world conditions.

Further, usability tests conducted in such a manner can be costly since providers of the tests may need to cover various costs (e.g., rent, equipment, employee payroll, etc.). This high cost may lead to limited rounds of usability testing, ineffective analysis of bad test results, or even the lack the testing process altogether. Thus, the cost of usability testing in a controlled environment such as a lab can discourage completion of a fully iterative process of testing and optimized software.

Embodiments of the present invention provide systems and methods for more effective usability testing of software applications (e.g., mobile applications) on devices (e.g., mobile devices). Embodiments may come in a number of forms, such as for example an SDK (software development kit) that can be run with a mobile application that is to be tested for usability. This forgoes the need for someone to monitor the usability test while it is being conducted.

Embodiments of the present invention enable utilization of various sensors (e.g., camera, microphone, touch sensor, etc.) on a mobile device running the mobile application to capture usability data during usability testing. Additionally, embodiments enable processing of the captured usability data by the mobile device. This forgoes the need for a controlled testing environment and external recording devices to monitor a usability test being conducted with the device.

The features described below may provide valuable insight into the usability of software applications that are being tested. Embodiments of the invention enable a solution that may be used on a mobile device in real-world conditions at relatively low cost. This allows for usability testing that is more accessible, convenient, and effective.

I. Usability Testing

A. Initialization

In one embodiment, usability testing functionality may be packaged into an SDK (software development kit) that may be included in a native mobile application's code that is to be the subject of usability testing. After the mobile application with bundled SDK is loaded onto a mobile device, the SDK may capture certain data and send it to another computer for analysis.

The SDK may be acquired in a number of ways. For example, it may be downloaded from a website, or it may be packaged into a larger suite of developer tools. After the SDK is acquired, it may be included in the uncompiled source code of the mobile application to be tested for usability. The SDK may be integrated into the source code in any suitable manner depending on the development platform that the mobile application is compiled on (e.g. iOS, Android, Windows, etc.). In some implementations, the SDK may then be initialized with a unique API key at the entry point to the mobile application (e.g., the App Delegate "didFinishLaunchingWithOptions" for iOS). The API key may be a token that is submitted alongside mobile web service (or similar) requests in order to identify the origin of the request, allowing for positive source authentication.

B. Tasks and Sessions

Embodiments conduct usability testing for tasks during sessions that occur when a user utilizes a mobile application. A description and example of tasks and sessions are provided below.

As used herein, a "task" may be any activity performed by a user. For example, a task may be any activity that the user accomplishes while using a mobile application. In some embodiments, the task may be specific and contextually relevant to the mobile application that is to be tested for usability. Multiple tasks may be the subject of usability testing for the mobile application. Each task may be conducted over a time period and may be associated with one or more actions (e.g., clicks, swipes, scrolls, etc.) that occur during the time period. In an exemplary case, a task may be for the user to utilize a mobile application to reserve a taxi to go from location A to location B. Any data collected while this task is being performed can be associated with the task.

As used herein, a "session" may be associated with a usability test. For example, a session may indicate the time period over which a usability test is performed, as well as data recorded during the usability test. A session may comprise information associated with one or more tasks. In some cases, a session may be information related to tasks performed by a user using a mobile application. In some implementations, the start and end of a session may be manually indicated based on user input. In other implementations, the start and end of a session may be predefined based on a time limit or other actions. Data captured during a session may be combined to generate a session output.

In certain embodiments, after the application with the SDK installed is opened, a gestural event such as a shake of the mobile device or triple-tap of the home button may activate the SDK for a session. At this point, instructions and a list of tasks to complete may be presented to the user (e.g., by a displayed message). The user may understand how to start and end a session based on instructions provided to the user when the SDK is activated. In some cases, the user can activate a user interface (UI) control (e.g., a "Go" or "Start Session" button), which can cause entry into usability testing mode. Upon entering usability testing mode, the mobile device may record data associated with the session. The data that is recorded may be stored, compiled, and analyzed during or after the session. After a certain time period, the session may be ended based on another event, such as the user shaking the device, the user activating a "Stop" button, after the passing of a predefined length of time (e.g. 120 seconds), or other detected action.

As described above, a session may maintain configurable tasks that the user is to perform for a usability test. In some embodiments, tasks may be defined prior to the session by using an online platform, and the tasks can then be synced to the session upon launching an application with a unique API key. Thus, the tasks can be provided to a user as part of the session.

II. System Architecture

FIG. 1 shows a block diagram 100 of the architecture of a system for usability testing according to embodiments of the present invention. FIG. 1 includes a mobile device 150, a third party provider computer 160, and a cloud database 170. Mobile device 150 may be operated by a user. Mobile device 150 may be in communication with third party provider computer 160 by any suitable communications network.

A. Mobile Device

Mobile device 150 may be any suitable electronic computing device that can be operated by the user. Mobile device 150 may comprise a processor 101, as well as a display 102, a camera 103, a microphone 104, a speaker 105, a touch sensor 106, and a screen capture device 107 coupled to processor 101. Mobile device 150 may also comprise a network interface 108 for communicating with other entities over a communications network. Mobile device 150 may also include a computer readable medium 110 coupled to processor 101. Computer readable medium 110 may comprise instructions, that when executed by processor 101, perform any method described herein.

Mobile device 150 may be any suitable portable device. In some embodiments, mobile device 150 may be hand-held and compact so that it can fit into a pocket (e.g., pocket-sized). Some non-limiting examples of mobile device 150 may include cellular phones, keychain devices, personal digital assistants (PDAs), pagers, notebooks, laptops, note-pads, wearable devices (e.g., smart watches, fitness bands, jewelry, etc.), automobiles with remote communication capabilities, personal computers, and the like.

Processor 101 may process functions of mobile device 150. Processor 101 may include hardware within mobile device 150 that can carry out instructions embodied as code in computer-readable medium 110. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Display 102 may be any suitable device that can visually present information. In some embodiments, display 102 may enable touch functionality. For example, display 102 may comprise a touch-sensitive panel covering. In some embodiments, display 102 may display a user interface (e.g., of mobile application 120 or website) that may allow the user to select and interact with objects presented on display 102. The objects may include, but may not be limited to, menus, text fields, icons, and keys/inputs on a virtual keyboard. Display 102 may also enable presentation of data captured by camera 103.

Camera 103 may be any suitable device that can record images. The images may be in any suitable form, including photographs, film, and video. In some embodiments, camera 103 may be front-facing on mobile device 150 such that can capture images of the user's face when the user utilizes mobile application 120. In some cases, camera 103 may be one of multiple cameras on mobile device 150, where camera 103 is front-facing. In other cases, mobile device 150 may enable any suitable motion (e.g., flip, swivel, twisting, etc.) that can point camera 103 in the front-facing direction.

Microphone 104 may be any suitable device that can convert sound to an electrical signal. In some cases, microphone 104 may be utilized to capture one or more voice segments from a user. In some embodiments, microphone 104 may enable the user to transmit voice segments to mobile device 150 while the user utilizes mobile application 120. For example, the user may utilize voice commands detected by microphone 104 to provide instructions to mobile device 150. In some cases, the user may provide the voice commands to navigate through mobile application 120.

Speaker 105 may be any suitable device that can produce sound in response to an electrical audio signal. Speaker 105 may play recorded sounds, such as those recorded by microphone 104, as well as prerecorded messages to communicate with the user. In some cases, the user may be able to receive instructions by voice communications played by speaker 105 to which the user may respond (e.g., by returning voice command, activating input elements, etc.).

Touch sensor 106 may be any suitable device that can detect input based on physical touch. In some embodiments, touch sensor 106 may detect touch events from the touch-sensitive panel of display 102. The touch event may be entered by the user's hands or fingers, or by any suitable device (e.g., stylus). Touch sensor 106 may be able to detect the location of each touch event on display 102, the length of each touch event, as well as the type of touch input (e.g., swipe, press, scroll, multi-tap, etc.).

Screen capture device 107 may be any suitable device that can record data shown on display 102. For example, screen capture device 107 may capture images of data presented on display 102 in periodic intervals (e.g., every $\frac{1}{32}^{nd}$ of a second) over a certain time period. Appending the captured images (e.g., video frames) can create a motion video that shows data displayed by display 102 over the time period. In some embodiments, screen capture device 107 may be known as a real-time video writer, data persister, or the like.

Network interface 108 may be any suitable combination of hardware and software that enables data to be transferred to and from mobile device 150. Network interface 108 may enable mobile device 150 to communicate data to and from another device (e.g., third party provider computer 160, etc.). Some examples of network interface 108 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 108 may include Wi-Fi™.

Data transferred via network interface 108 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 108 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Computer readable medium 110 may comprise a mobile application 120, which may include usability software 130. In some embodiments, usability software 130 may be embedded within mobile application 120. In some cases, multiple mobile applications that enable usability testing functionality according to embodiments of the invention can exist on mobile device 150. In such cases, usability software 130 may be stored in multiple separate locations, within each of the multiple mobile applications, on mobile device 150. Further detail regarding usability software is described with respect to FIG. 2.

B. Third Party Provider Computer

Third party provider computer 160 may be a server computer associated with a third party. In some embodiments, the third party may be any suitable entity that may have an interest in the results of usability testing conducted by usability software 130. For example, the third party may be software-as-a-service (SaaS) provider. Third party provider computer 160 may be in communication with mobile device 150 and receive data (e.g., session output) from mobile device 150. Third party provider computer 160 may simply store the data or, in some cases, utilize the data to view or edit results of the usability testing. In some cases, third party provider computer 160 may be in communication with a cloud database 170.

Cloud database 170 may be any suitable storage that runs on a network platform. Cloud database 170 may store, manage, and process data associated with third party provider computer 160. For example, cloud database 170 may store session outputs received from mobile device 150, as well as any updated versions of session outputs revised by third party provider computer 160.

III. Usability Software

Figure 2:
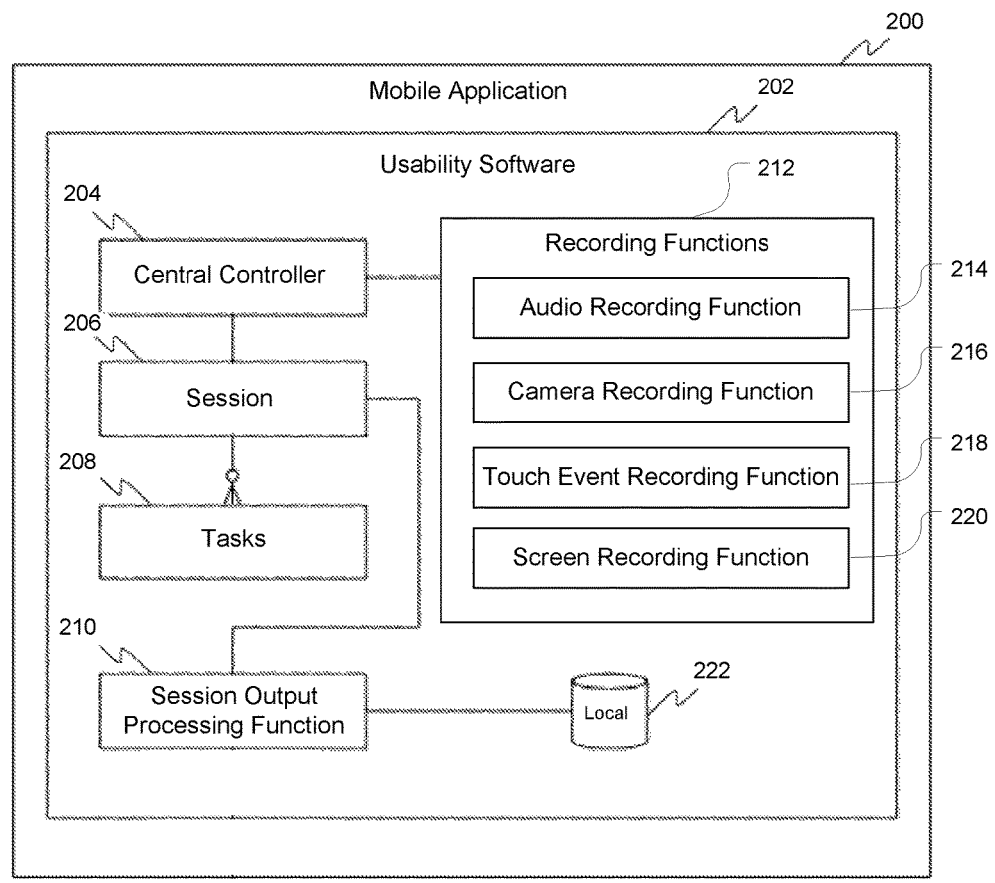
FIG. 2 shows a block diagram of the architecture of an application with usability software according to embodiments of the present invention.

FIG. 2 shows a block diagram of the architecture of an application with usability software according to embodiments of the present invention. FIG. 2 includes a mobile application 200 residing on a mobile device (e.g., mobile device 150 of FIG. 1) and that comprises usability software 202. Mobile application 200 may also be known as an application, a software application, or the like. Usability software 202 may comprise a central controller 204, a session 206, tasks 208, recording functions 212, a session output processing function 210, and local storage 222. Usability software 202 may enable setup of session 206 for a usability test and recording of usability data while the usability test is conducted on the mobile device operated by a user.

A. Session Setup

Central controller 204 may control functionality of usability software 202. For example, central controller 204 may configure events (e.g., button press, shaking motion, etc.) that trigger recording functions 212 to initiate or terminate recording of data (e.g., usability data). Central controller 204 may recognize such trigger events when they occur and accordingly notify recording functions 212 to either to start or stop recording. Central controller 204 may be registered with a number of predefined recording functions 212 that may record different types of data in parallel. Each of the functions of recording functions 212 may be associated with a sensor that can capture data on the mobile device.

After detecting a trigger event to start recording, central controller 204 may initialize session 206 in order to conduct a usability test. In some embodiments, one or more tasks 208 may be defined prior to session 206 for the usability test. Central controller 204 may provide tasks 208 to the user through mobile application 200 during the usability test. In some cases, tasks 208 may indicate a specific chronological order in which they are to be presented to the user. Accordingly, central controller 204 may present tasks 208 in the appropriate order. Data recorded by recording functions 212 during each task may be stored as part of session 206. In some cases, data may be recorded continuously, periodically, or during specified time periods. After detecting a trigger event to stop recording, central controller 204 may stop collection of data for session 206 by communicating the termination to the recording functions.

B. Recording Functions

In certain embodiments, recording functions 112 may record multiple streams of usability data during the usability test. Recording functions 112 may include an audio recording function 214, a camera recording function 216, a touch event recording function 218, and a screen recording function 220. Recording functions 112 are described in more detail below.

1. Audio Recording Function

Audio recording function 214 may record the mobile device's microphone's audio stream to a data file. The data file may be any suitable file type (e.g., .mp3, .wav, etc.) that is supported by the mobile device. Any data captured by audio recording function 214 may be associated with a timestamp that indicates when the data was recorded. Audio recording function 214 may receive instructions from central controller 204 to initiate or terminate recording of the audio stream.

The recorded data can serve to provide auditory information as to the user's experience during the usability test. For example, a task may include utilization of voice commands from the user to navigate through mobile application 200. Additionally, a task may involve audio instructions played by the mobile device for the user. Recording these audio inputs and outputs may provide usability data that can indicate whether the user successfully administered voice commands or understood audio instructions.

The recorded audio can further serve to provide contextual data regarding the usability of mobile application 200. For example, if the user speaks or makes sounds while the usability test is being conducted, the recorded audio may include these audio inputs. Such audio inputs can be useful to determine the emotional state of the user. For example, there are several auditory cues that can indicate that a user is feeling confusion or frustration, such as a sigh, exclamation, or question. This may show how the user interface for conducting the task associated with these auditory cues can be further optimized for an improved user experience. For example, the user interface for the task that made the user frustrated may be changed to enable easier navigation through the mobile application.

2. Camera Recording Function

Camera recording function 216 may record the mobile device's camera stream as a data file. Camera recording function 216 may receive instructions from central controller 204 to initiate or terminate recording of the camera stream. The data file may be any suitable file type (e.g., .mpg, .mov, etc.) that is supported by the mobile device. Any data captured by camera recording function 216 may be associated with a timestamp that indicates when the data was recorded.

The mobile device's camera may be front-facing such that the user's face may be visible in the camera stream. In some embodiments, camera recording function 216 may enable biometric recognition based on the camera stream, such as eye-tracking or facial recognition. In some cases, camera recording function 216 may capture images in periodic intervals (e.g., every $\frac{1}{32}^{nd}$ of a second) from the camera stream over a certain time period. Appending the captured images (e.g., video frames) can create a motion video that shows the user's facial expressions over the time period.

The recorded video can serve to provide visual information as to the user's experience during the usability test. In some cases, footage of the user's face from the recorded video may be utilized to analyze facial expressions of the user and associate certain emotions indicated by the facial expressions with certain portions of the usability test. For example, a user's facial expression during a certain task may indicate frustration experienced by the user, which shows that the user interface for conducting the task can be further optimized for an improved user experience.

In some cases, footage of the user's face may be utilized for eye-tracking purposes. Such eye-tracking information may indicate what areas of the display the user is looking at while conducting certain tasks. If the user is not looking at an expected area of the display, such as an area that includes a button for conducting a next step in a task, this may indicate that the user is lost and is having trouble completing the task. Thus, this may indicate how the user interface for conducting the task can be further optimized for an improved user experience. For example, the button may be moved to a different location in the user interface or may be changed to be a different color for better visibility.

Data recorded by camera recording function 216 can be essential in understanding the emotion experienced by the user during usability testing. While it may be possible for the user to narrate their experience and feelings and capture such narration via audio during the usability test, the user may need specific training in order to perform effective narration. Further, narration may affect the accuracy of the usability test, since the user would not normally narrate while utilizing the mobile application in the real world. Camera recording function 216 allows the user to act naturally, with no need for training, in order to get insight into the emotions experienced by the user during the use of the mobile application. Confusion, delight, and boredom may be some of the emotions that can be observed by studying a user's facial expressions, which can then be tied to specific tasks and features of the mobile application. These specific tasks and features may then be appropriately updated based on the user's emotional responses.

3. Touch Event Recording Function

Touch event recording function 218 may record the mobile device's touch sensor data as a data file. The data file may be any suitable file type that is supported by the mobile device. Any data captured by touch event recording function 218 may be associated with a timestamp that indicates when the data was recorded. In some cases, the data may include information related to touch events conducted by the user on the mobile device. Touch event recording function 218 may receive instructions from central controller 204 to initiate or terminate recording of the touch sensor data.

The recorded touch sensor data can serve to provide information as to the user's experience during the usability test. For example, data recorded by touch event recording function 218 may include information related to all activity (e.g., touch events) conducted by the user related to touching the touch screen display of the mobile device. Such activity may include gestures (e.g., press, swipe, scroll, multiple tap, etc.), button presses, and other interactions. The information may include the location on the display of the mobile device that touch events occurred (e.g., x and y positions corresponding to where fingers touch the screen), the start and end location of a touch event (e.g., start and end positions of a swipe or scroll), the length of a touch event (e.g., 1 second), the type of touch event (e.g., press, swipe, scroll, multi-tap), and other relevant data.

Data captured with touch event recording function 218 may provide insight into how the user interacts with the mobile application. In some cases, the data can show any of the user's erroneous attempts to complete a task. For example, the captured data may show that the user clicked a portion of the display that was not meant for the task or not meant to be interactive at all. Further, in some cases, the data can show that the user utilized an incorrect type of gesture (e.g., tap instead of swipe) to activate an input element in the user interface of the mobile application. Such information shows how the user interface for conducting the task can be further optimized for an improved user experience. For example, the interactive area of the display may be revised to be more obvious or the input element may be revised to implement a different gesture (e.g., button press) that is expected to be simpler to understand.

4. Screen Recording Function

Screen recording function 220 may record images of the mobile device's display to a data file. The data file may be any suitable file type (e.g., .mpg, .mov, etc.) that is supported by the mobile device. Any data captured by screen recording function 220 may be associated with a timestamp that indicates when the data was recorded. Screen recording function 220 may receive instructions from central controller 204 to initiate or terminate recording of the display.

Screen recording function 220 may capture data corresponding to what the user sees on the display during the usability test. The data may be captured as a video made up of video frames. For example, screen recording function 220 may capture a video frame by taking a screen capture of the display at certain intervals (e.g., $\frac{1}{32}$ of a second) during the usability test. The captured video frames may then be appended chronologically. The video frames may be captured frequently enough that they can enable the appearance of a fluid motion video (e.g., screencast).

The recorded data can serve to provide information as to the user's experience during the usability test. For example, the recorded data may show the order of the various screens that the user navigated through while utilizing the mobile application. Additionally, the recorded data may also indicate other accompanying information (e.g., how long the user stayed on each screen, whether the user returned to a previous screen, etc.). Combining the data captured by screen recording function 220 with other usability data captured by recording functions 212 may provide useful information to effectively determine how to optimize usability of mobile application 200.

C. Session Output Processing Function

Session output processing function 210 may generate a session output based on the data captured by recording functions 212. After central controller 204 indicates that session 206 is terminated, recording functions 212 may stop recording data and session output processing function 210 may generate the session output. In some embodiments, session output processing function 210 may receive captured data from recording functions 212 in real-time. In other embodiments, session output processing function 210 may receive captured data from recording function 212 periodically or after session 206 is terminated. Similarly, session output processing function 210 may update the session output in-real time as captured data is received, periodically, or after session 206 is terminated.

The session output generated by session output processing function 210 may be a data file that combines multiple streams of data. For example, the data file may be a video file comprising video frames, where the video frames may be associated with a plurality of timestamps. The video file may include audio data captured by audio recording function 214, camera data captured by camera recording function 216, touch event data captured by touch event recording function 218, and display data captured by screen recording function 220. Session output processing function 210 may combine the multiple streams of data into the video file, such that they are all in sync based on corresponding timestamps. Exemplary formats of session outputs are described in further detail in FIG. 5 and FIG. 6.

Session output processing function 210 may also store the session output in an appropriate location. Central controller 204 may configure storage instructions for session 206 and communicate the instructions to session output processing function 210. In some embodiments, session output processing function 210 may store the session output locally at the mobile device, such as at local storage 222. In other embodiments, session output processing function 210 may automatically forward the session output to a remote location, such as to a third party provider computer or associated cloud storage (e.g., third party provider computer 160 and cloud database 170 of FIG. 1) based on information in the storage instructions. In some cases, session output processing function 210 may store the session output in both a local and remote storage.

In some embodiments, running the usability software on the mobile device may increase utilization of processing power and memory. For instance, storing or sending of a session output may bring about such effects.

However, to deal with these potential effects, the usability software may adjust to optimize use of computing resources (e.g., processing power, memory, etc.). For example, to avoid utilizing too much bandwidth, session output processing function 210 may choose to send a session output when the mobile device is connected to a Wi-Fi™ network, if the session output is over a certain file size. Additionally, in some cases, session output processing function 210 may delete a session output stored locally at the mobile device if it is determined that the session output has been successfully sent to and stored at a remote location.

Further, in some implementations, session output processing function 210 may adjust usage of computing resources when generating and updating the session output. For example, session output processing function 210 may select an appropriate method in which to update the session output (e.g., in real-time, periodically, or after termination of the session output) based on current availability of computing resources.

IV. Usability Data Collection and Analysis

A. Method and Combining Recorded Data

Figure 3:
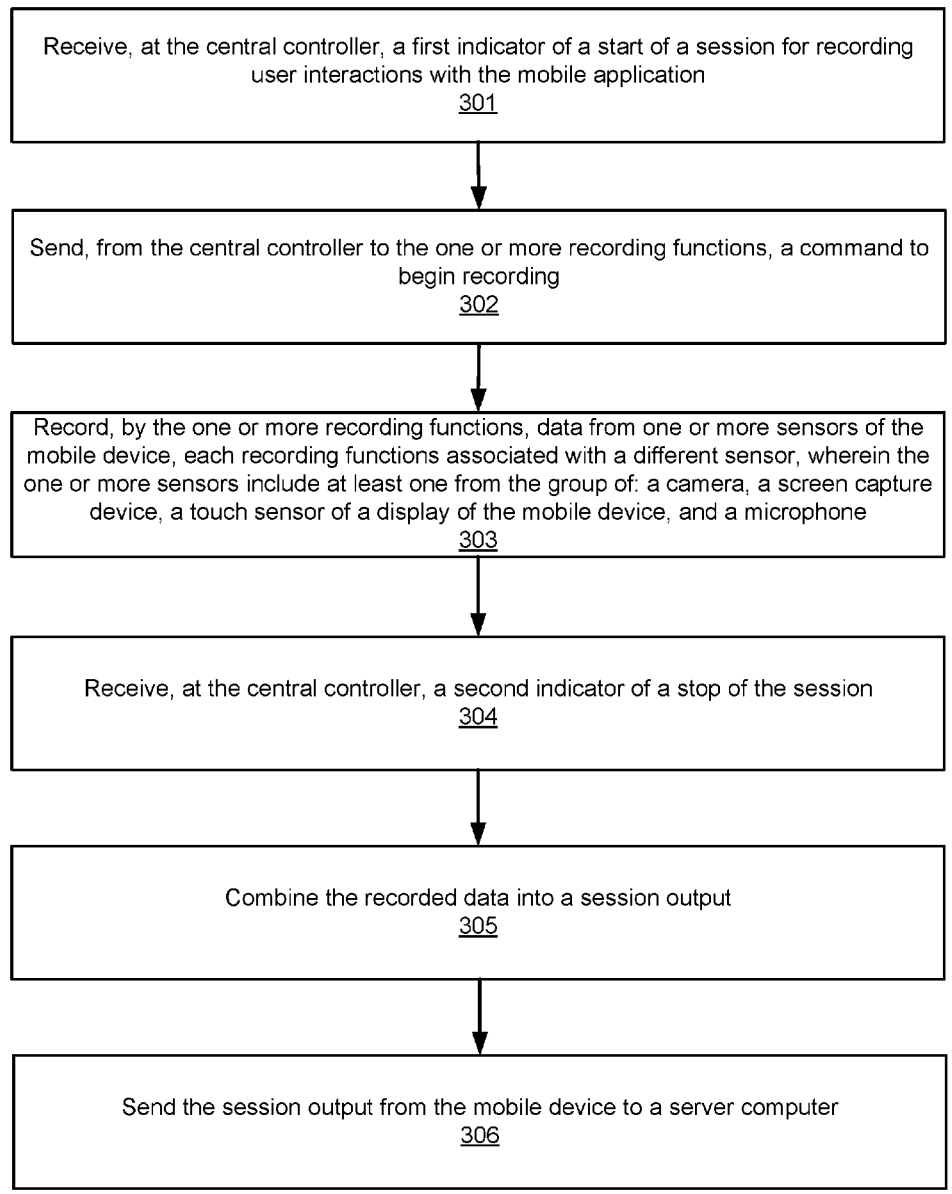
FIG. 3 shows a flow diagram of a method of conducting usability testing according to embodiments of the present invention.

FIG. 3 shows a flow diagram 300 of a method of conducting usability testing according to embodiments of the present invention. The method may be conducted by a mobile device that a user utilizes during a usability test. The mobile device may have one or more processors executing a mobile application that includes usability software, which may include a central controller and one or more recording functions. Certain steps shown in FIG. 3 may be described with respect to FIG. 4.

At step 301, the central controller may receive a first indicator of a start of a session for recording user interactions with the mobile application. The session may correspond to the usability test. In some embodiments, various types of indicators may be configured with the central controller before the start of the session. In some cases, the first indicator may be predefined as a certain action (e.g., launching of the mobile application, opening of a particular screen, etc.), which may automatically trigger the start of the session.

In some cases, the indicators may involve user input to the mobile device, such as a particular motion (e.g., shaking, tapping, etc.), a button press, a voice command, or the like. The central controller may display a notification indicating an appropriate type of indicator that the user may utilize when the mobile application is launched. Subsequently, the user may input the indicator to the mobile device. When the central controller recognizes that the indicator has been input by the user, the session may be initialized.

At step 302, the central controller may send a command to begin recording to the one or more recording functions. The command may be in any suitable form, such as a message including an identifier (e.g., boolean, etc.) indicating that recording should be initiated. In some embodiments, each recording function may be associated with a different sensor on the mobile device. Upon receiving the command from the central controller, the one or more recording functions may trigger activation of the corresponding sensors on the mobile device.

At step 303, the one or more recording function may record data from one or more sensors of the mobile device. In some embodiments, the one or more sensors can include at least one from the group of: a camera, a screen capture device, a touch sensor of a display of the mobile device, and a microphone. The camera may be front-facing (e.g., pointing towards the user's face) and may capture a camera stream. The screen capture device may record screen captures of the display of the mobile device, such that the screen captures may be appended together to create a smooth motion video. Thus, the video may show what the user saw on the mobile device display during the usability test. The touch sensor may capture any information related to user touch-related interactions with the display (e.g., touch events). The microphone may capture an audio stream. Any data recorded by the one or more recording functions may be associated with a timestamp indicating the time at which the data was recorded.

At step 304, the central controller may receive a second indicator of a stop of the session. In some embodiments, various types of indicators may be configured with the central controller before the start of the session. In some cases, the second indicator may be predefined as a certain action (e.g., closing of the mobile application, opening of a particular screen, receipt of a message, etc.), which may automatically trigger the termination of the session.

In some cases, the indicators may involve user input to the mobile device, such as a particular motion (e.g., shaking, tapping, etc.), a button press, a voice command, or the like. The central controller may display a notification indicating an appropriate type of indicator that the user may utilize when the mobile application is launched. Subsequently, the user may input the indicator to the mobile device. When the central controller recognizes that the indicator has been input by the user, the session may be terminated.

At step 305, the recorded data may be combined into a session output. As described above, in some implementations, the session output may be a single file that includes multiple data streams captured by the one or more sensors on the mobile device. A method of combining the recorded data can be described in further detail with respect to FIG. 4.

Figure 4:
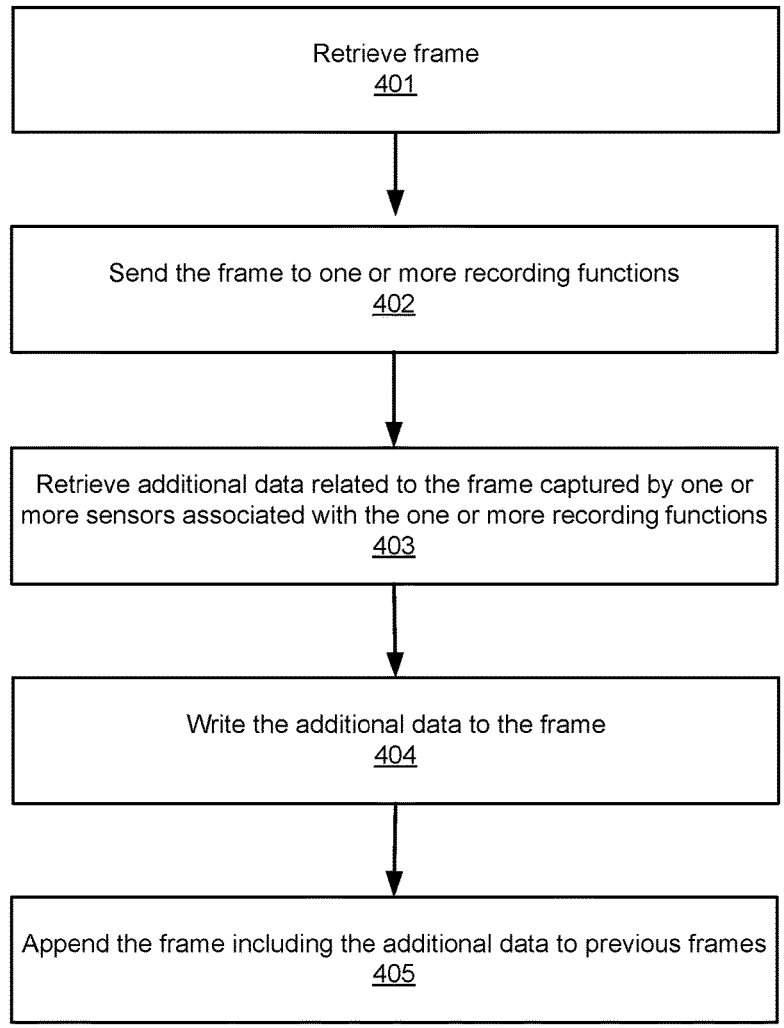
FIG. 4 shows a flow diagram a method of combining usability data according to embodiments of the present invention.

FIG. 4 shows a flow diagram 400 of a method of combining usability data according to embodiments of the present invention. The combined usability data may result in a session output. In some embodiments, the session output may be a video file comprising video frames. The method may be conducted by a mobile device that a user utilizes during a usability test. The mobile device may have one or more processors executing a mobile application that includes usability software, which may include a central controller and one or more recording functions.

The method in FIG. 4 may be performed for each video frame that is to be included in the session output. In some embodiments, the method may be performed for each video frame at a time, such as in chronological order. In other embodiments, the method may be performed for multiple video frames at once, in parallel.

At step 401, a frame from the session output may be retrieved. In some embodiments, an image captured by the screen recording function may be written to the video frame. The screen recording function may be associated with the screen capture device of the mobile device and may record images of the display of the mobile device during the usability test. The retrieved frame may include one of the images captured by the screen capture device at a certain time during the usability test. The retrieved frame may be associated with a timestamp corresponding to the time that the image was captured.

At step 402, the frame may be sent to the one or more recording functions. The one or more recording functions may include the audio recording function, the camera recording function, and the touch event recording function. In some cases, the frame may be sent to one recording function at a time. In other cases, the frame may be sent to multiple of the one or more recording functions at the same time. In some embodiments, the frame may be sent along with a request to add additional data to the retrieved frame, where the additional data is captured by one or more sensors associated by the one or more recording functions. The request may include the timestamp associated with the retrieved frame.

At step 403, the one or more recording functions may retrieve the additional data related to the retrieved frame. The additional data may be captured by one or more sensors associated with the one or more recording functions. In some cases, the additional data may include audio data recorded by the audio recording function associated with the microphone of the mobile device, camera data recorded by the camera recording function associated with the camera of the mobile device, and touch event data recorded by the touch event recording function associated with the touch sensor of the mobile device. For example, the audio data may be a portion of an audio stream, the camera data may be a video frame (e.g., image) from a video stream, and the touch event data may be position information (e.g., x and y position on mobile device display) related to multiple touch events.

The one or more recording functions may retrieve the additional data based on the timestamp associated with the received frame. For example, the audio data, camera data, and touch event data retrieved by the one or more recording functions may be data captured at the same time, recognized by corresponding timestamps, at which the received frame was captured by the screen recording function associated with the screen capture device. This may enable synchronization of multiple data streams recorded during the usability test. Accordingly, in some embodiments, there may be no touch event data to be added to the frame if no touch event occurred at the time corresponding to the timestamp associated with the received frame.

At step 404, the one or more recording functions may then write the additional data to the received frame. In some cases, each of the one or more functions may sequentially write the additional data to the received frame. In other cases, the one or more functions may write the additional data to the received data at the same time, in parallel. Examples of how the recording functions may write the additional data to the frame are described below.

The camera recording function may write the additional data to the received frame in any suitable manner. In some implementations, the camera recording function may render the retrieved additional data, which may include the video frame from the camera stream of the user's face captured by the camera of the mobile device, onto a portion of the received frame from the screen recording function. For example, the video frame of the user's face may be rendered into a small shape (e.g., box, circle, etc.) in one of the corners of the received frame (See FIG. 6 for reference). In another example, the video frame of the user's face may be rendered to be adjacent to the received frame (e.g., tiled). This additional data may enable the display seen by the user performing the usability test to be viewed along with the user's reaction to the display.

The touch event recording function may write the additional data to the received frame in any suitable manner. In some embodiments, the touch event recording function may render the retrieved additional data, which may be based on position information (e.g., x and y position on mobile device display) related to a touch event capture by the touch sensor of the mobile device, onto a certain area of the image (e.g., screen capture of the display) recorded by the screen capture function that is included in the received frame. In some cases, the additional data may be rendered in the form of one or more visual indicators.

The touch event may be represented in a variety of ways. For example, a visual indicator centered at the position on the display of the mobile device that the touch event occurred can be rendered into the received frame. The visual indicator may be of any shape (e.g., circle, dot, star, etc.) and any color that can be displayed by the mobile device.

In some implementations, the temporal nature of the touch event may be indicated by the additional data. In this case, the additional data may include information related to multiple touch events, based on a list of touch events recorded by the touch event recording function that take place on the mobile device. In one exemplary implementation, the visual indicator associated with the touch event that occurred at the time associated with the received frame can be rendered at full opacity. In addition, visual indicators associated with touch events that occurred prior to the touch event may be rendered with reduced opacity.

In some cases, the greater the amount of time that has passed since a prior touch event occurred relative to the timestamp associated with the received frame, the further reduced opacity with which the visual indicator associated with the prior touch event may be rendered. Thus, if a prior touch event took place long enough prior to timestamp associated with the received frame, the visual indicator associated with the prior touch event may be close to invisible. Subsequently, such a prior touch event may be removed from the list of touch events that are to be indicated with a visual indicator, in order to free memory.

The audio recording function may write the additional data to the received frame in any suitable manner. In some embodiments, the audio recording function may composite the additional data, which may include a portion of an audio stream captured by the microphone of the mobile device, to the received frame. The portion of the audio stream may be associated with a timestamp that corresponds to that associated with the received frame.

As a result, the received frame may be updated to include additional data comprising multiple streams of data captured by the mobile device. For example, the received frame may be updated to include additional data comprising an image (e.g., screen capture) of the display of the mobile device overlaid with a box rendered in the corner of the image showing a video frame of the video feed captured by the camera of the mobile device, as well as visual indicators indicating touch events (See FIG. 6 for reference). Additionally, the received frame may be composited with audio data from the audio stream captured by the microphone of the mobile device.

At step 405, the frame including the additional data may be appended to previous frames processed by the mobile device. The frame including additional data may be appended such that it chronologically follows, based on corresponding timestamps, the previous frames that come before it. In some embodiments, based on the order in which the frames are processed, the frame may be inserted in between certain frames processed by the mobile device.

As described above, to complete the process of combining the data recorded by the mobile device into the session output, the method shown in FIG. 4 may be repeated for every frame to be included in the session output. As a result, the session output may be video file comprising a plurality of video frames associated with a plurality of timestamps. The video file can include additional data added by the recording functions of the mobile device. For example, camera data, touch event data, screen captures of the display, and audio data may be synchronized with the plurality of video frames based on the plurality of timestamps. The synchronized data may be stored into the video file.

Referring back to FIG. 3, at step 306, the mobile device may send the session output to a server computer. In some embodiments, the usability software in the mobile application being tested for usability may store information regarding the server computer to which the session output is to be sent. Thus, in some implementations, the session output may be automatically transmitted upon generation to the server computer. The server computer may then be able to store the session output, as well as enable viewing or editing of the session output in order to allow further usability testing analysis. In some cases, the mobile device may also store the session output locally.

In one concrete example following the flow diagram of FIG. 3, a user may be performing the task of requesting a taxi using the mobile application on their mobile device during a usability test. The user may press a start button to indicate the start of a session. The central controller may send a command to begin recording to one or more recording function of the mobile device, which may cause the one or more recording functions to start recording data from one or more sensors of the mobile device. The user may interact with the mobile application to request the taxi, such as entering a start and end location. This may cause the mobile application to send the request to a server associated with the mobile application.

Subsequently, the server response may return a message that the request was successfully received, which may enable central controller to recognize that the task was completed. In some embodiments, the central controller may be preconfigured to recognize (e.g., by an identifier) that the receipt of the message from the server response indicates the completion of the task. A message may then be displayed by the mobile application that the task has been completed. In some cases, this may terminate the session and recording of data by the one or more recording functions. The mobile device may generate a session output including a combination of the multiple streams of data captured by the one or more recording functions. The session output may then be stored locally by the mobile device, as well as sent to a remote storage based on configurations stored by the central controller.

B. Data Output

Figure 5:
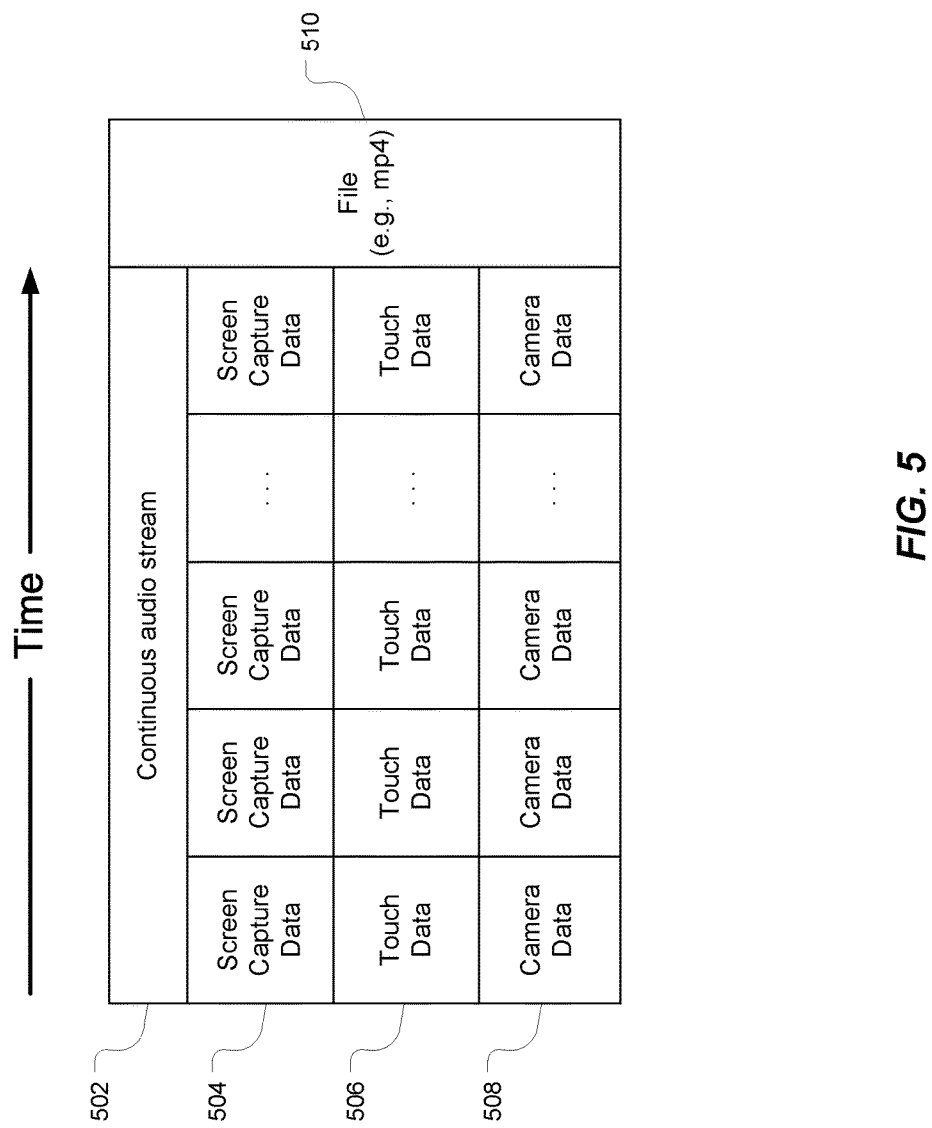
FIG. 5 shows a block diagram of an exemplary session output according to embodiments of the present invention.

FIG. 5 shows a block diagram of an exemplary session output 510 according to embodiments of the present invention. Session output 510 may be associated with a usability test conducted by a user using a mobile device. In some embodiments, usability data recorded during the usability test may be recorded by one or more recording functions of the mobile device, which may include an audio recording function, a camera recording function, a touch event recording function, and a screen recording function.

In the illustrated example, session output 510 may be a video file of any suitable file format (e.g., .mp4) that includes a combination of multiple streams of usability data recorded by the mobile device. For example, session output 510 may include a continuous audio stream 502 from the audio recording function, screen capture data 504 from the screen recording function, touch data 506 from the touch event recording function, and camera data 508 from the camera recording function.

The multiple streams of usability data may be inserted into session output 510 based on corresponding timestamps. For example, any portion of continuous audio stream 502, screen capture data 504, touch data 506, and camera data 508 that correspond to the same point in time within session output 502 may be associated with a common timestamp corresponding to the time at which the data was captured.

Figure 6:
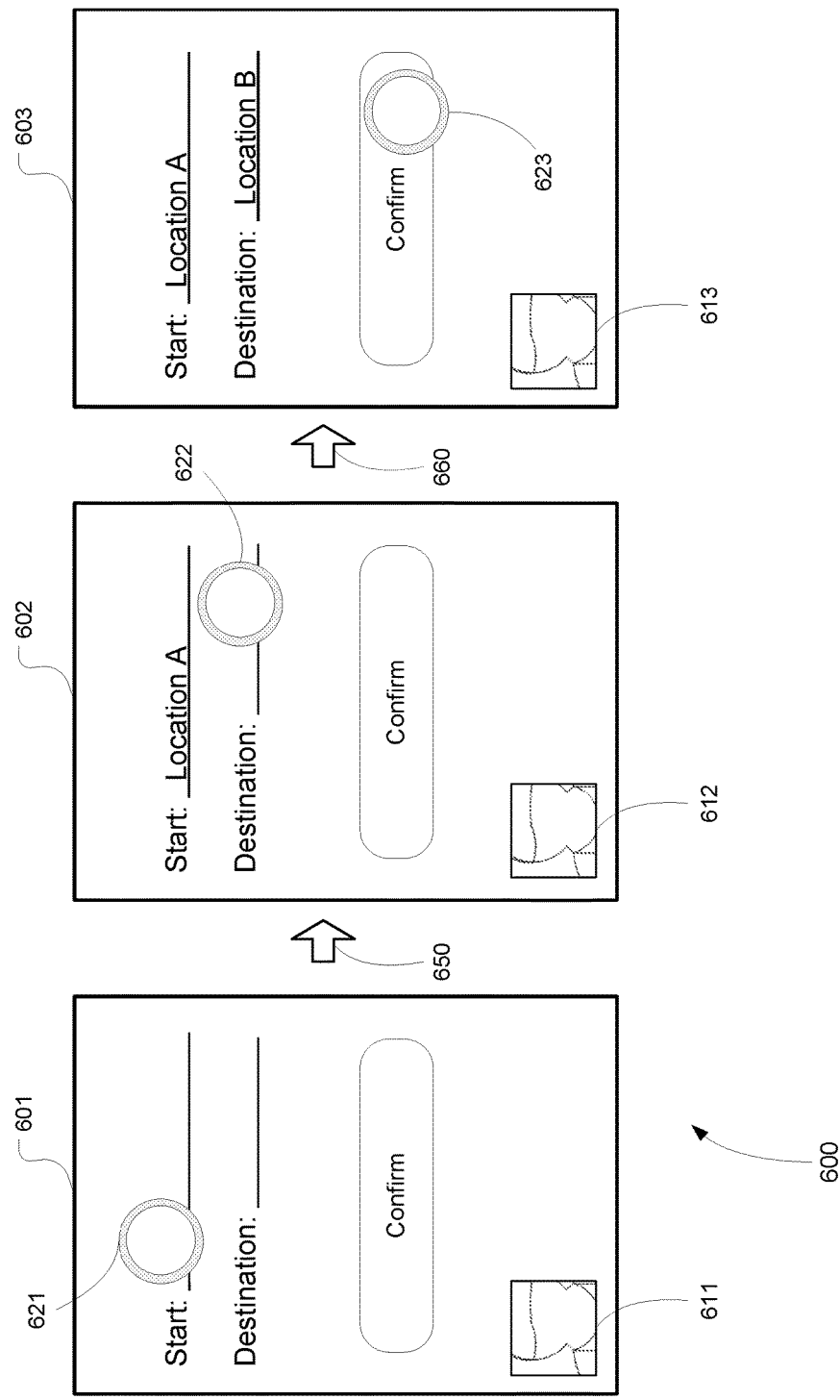
FIG. 6 shows a flow diagram of exemplary video frames of a session output according to embodiments of the present invention.

This may enable session output 510 to present what was shown on the display of the mobile device at a certain time, along with any touch events, audio, and camera images (e.g., of the user's face) that were captured at the same time. FIG. 6 shows one example of the several ways in which the multiple streams of usability data may be displayed by session output 510 in a video.

FIG. 6 shows a flow diagram 600 of exemplary video frames of a session output according to embodiments of the present invention. FIG. 6 includes video frame 601, video frame 602, and video frame 603, which may constitute a portion of the session output. While the video frames may be shown in chronological order from left to right, there may be one or more video frames that exist in between each of the video frames that are not shown in FIG. 6 for simplicity.

The session output may be associated with a usability test conducted by a user using a mobile device. In the illustrated example, the user may be performing a task during the usability test that involves entering a start and end location into a mobile application, such as a mobile application utilized for requesting taxi rides. In addition to the visual data described in FIG. 6, the video frames 601, 602, and 603 may also be associated with audio data (not shown) as described in FIG. 5.

Video frame 601 may comprise a first screen capture of the display of the mobile device overlaid with additional data. For example, video frame 601 may include camera data 611, which may be illustrated as a small box located in the corner of the first screen capture and includes an image taken from the camera stream of the mobile device's camera. In some embodiments, camera data 611 may show the facial expression of the user when the user viewed the mobile device's display as shown in the first screen capture.

Video frame 601 may also include touch data 621, which may be illustrated as a ring indicating the location of the mobile device's display at which a touch event occurred. The touch event corresponding to touch 621 may indicate that the user clicked the "Start" text field when the user viewed the mobile device's display as shown in the screen capture. At step 650, the user may have entered information, such as the text "Location A," into the "Start" text field.

Video frame 602 may comprise a second screen capture of the mobile device overlaid with additional data. Similarly to video frame 601, video frame 602 may include camera data 612 and touch data 622. Camera data 612 may show the facial expression of the user when the user viewed the mobile device's display as shown in the second screen capture. Touch data 622 may indicate that the user clicked the "Destination" text field when the user viewed the mobile device's display as shown in the second screen capture. At step 660, the user may have entered information, such as the text "Location B," into the "Destination" text field.

Video frame 603 may comprise a third screen capture of the mobile device overlaid with additional data. Similarly to video frame 601 and video frame 602, video frame 603 may include camera data 613 and touch data 623. Camera data 613 may show the facial expression of the user when the user viewed the mobile device's display as shown in the third screen capture. Touch data 623 may indicate that the user clicked the "Confirm" button when the user viewed the mobile device's display as shown in the third screen capture.

In some embodiments, video frames 601, 602 and 603 may be included (e.g., appended) in a video, which may show information about the usability of the mobile application for a certain task. For example, the video including video frames 601, 602 and 603 may show how long it took the user to complete the task of requesting a taxi ride from the start location to the end location. Further, the video may depict any issues that the user ran into based on camera data 611, 612, and 613, showing the user's facial expression while performing the task, audio data, presenting user comments and auditory responses while the user performed the task, and touch data 621, 622, and 623, showing the user's interaction with the mobile application interface while performing the task.

While FIG. 6 depicts one way in which multiple streams of data may be represented in a session output, other representations exists. The configurations in which the multiple streams of data can be displayed in the session output may be stored during the setup process for the usability testing.

Figure 7:
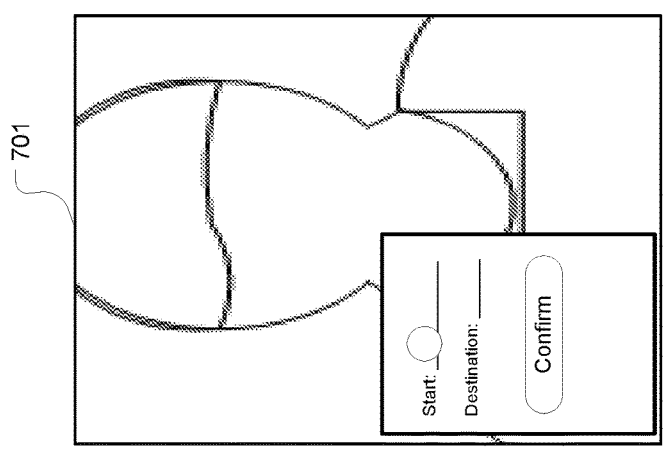
FIG. 7 shows an exemplary video frame of a session output according to embodiments of the present invention.

In one example, instead of the screen capture data of the mobile device's display acting as the main visual in the session output, the camera data recorded by the camera of the mobile device may act as the main visual in the session output. An example is shown by video frame 701 in FIG. 7. In this case, the camera stream of the user's face may be utilized as the background of the video frames of the session output. In some cases, the screen capture data may then be embedded in a small box or other suitable shape on the video frame. This configuration may be useful for a person analyzing the session output if they prefer to focus on certain emotions felt by the user during the usability test.

Figure 8:
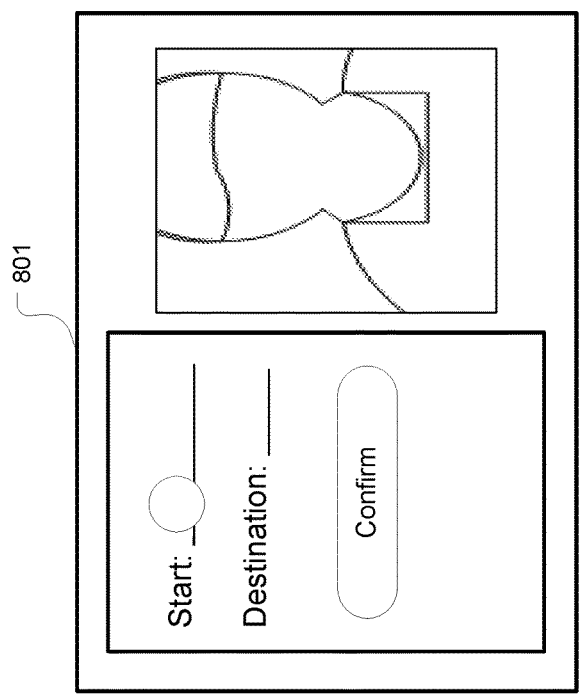
FIG. 8 shows an exemplary video frame of a session output according to embodiments of the present invention.

In another example, the session output may represent the screen capture data and the camera data in a tiled format. An example is shown by video frame 801 in FIG. 8. For example, instead of one type of data being overlaid with another type of data, the screen capture data and the camera data may be viewed adjacent to each other (e.g., side-by-side, top-and-bottom, etc.). In some cases, the screen capture data and the camera data may take up an equal amount of space in the video frames in the session output.

C. Usability Testing Uses and Benefits

Embodiments of the invention enable convenient collection and analysis of usability data for usability tests. While information regarding a single user may be gathered based on a usability test, embodiments also enable information to be aggregated regarding multiple users that performed the same usability test. Thus, usability of certain tasks associated with the usability test may be analyzed to pinpoint certain issues that groups of users consistently face.

Use of aggregated data may make effective optimizations to improve the usability of a mobile application. For example, it may be shown a majority of users take longer than expected to complete a certain task. This may be an indication that the user interface of the mobile application may be confusing and may motivate further research into a specific step during the task at which users may be running into problems. In some cases, it may be shown that the majority of users attempt to click on a certain portion of the user interface shown on the mobile device's display that is not meant to be interactive. This may indicate to developers to change the appearance (e.g., color, design, etc.) of that portion of the user interface to avoid confusion about its non-functionality. The variety of usability data (e.g., audio, camera, display, and touch) from which usability can be analyze enables more valuable insight for identifying issues with usability and potential solution to those issues.

There are several benefits provided by embodiments of the present invention. First, the cost of conducting usability testing can be much lower than in the case of utilizing a usability lab facility. For example, usability data can be collected without unnecessary external recording devices and lab setups. This makes usability testing a more accessible option for developers and further enables an effective iterative process that comprises more testing, more builds, and a more optimized product.

Second, usability data recorded by certain embodiments of the present invention may be more reliable than usability data recorded in usability labs. Embodiments of the present invention allow users to complete usability testing while they are using the mobile application in real-world conditions on their mobile device. For example, they may conduct the usability testing while sitting on the couch in the comfort of their home. In contrast, conducting the usability testing in a usability lab may involve traveling to a new location, being surrounded by external recording device, and other unusual stimuli. This may easily affect the results as the users' responses may differ from what they may usually respond. Therefore, embodiments enable results that are more accurate and meaningful, as they reflect how users use the mobile application in typical conditions under which they would normally utilize the mobile application.

V. Computer System

Figure 9:
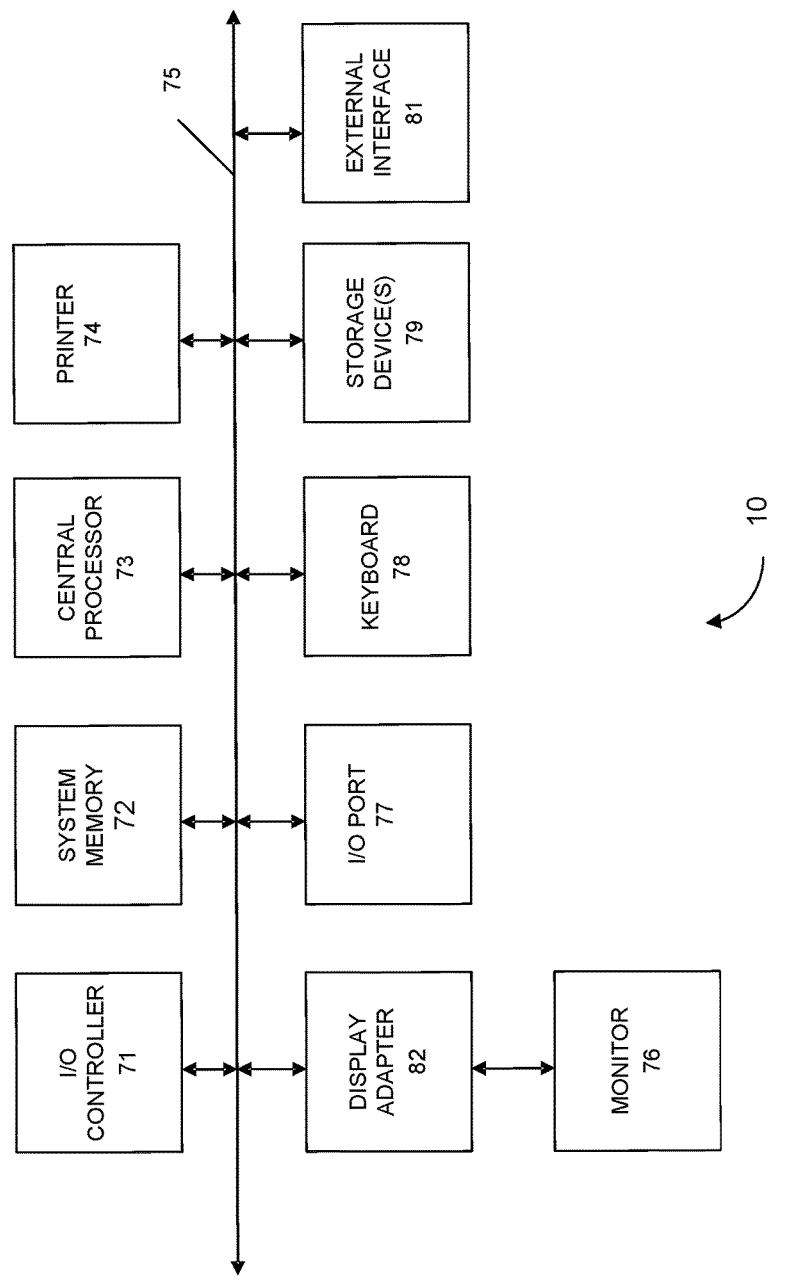
FIG. 9 shows a block diagram of an exemplary computer system according to embodiments of the present invention.

Any of the computer systems mentioned herein may utilize any suitable number of subsystems. Examples of such subsystems are shown in FIG. 9 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method comprising:
   at a mobile device having one or more processors executing a mobile application installed on the mobile device, the mobile application including usability software, the usability software including a central controller and a plurality of recording functions:
   receiving, at the central controller included in the usability software of the mobile application, a first indicator of a start of a session for recording a user's interactions with the mobile application installed on the mobile device;
   sending, from the central controller to the plurality of recording functions included in the usability software of the mobile application, a command to begin recording;
   recording, by the mobile device using the plurality of recording functions, data from a plurality of sensors of the mobile device, each recording function of the plurality of recording functions corresponding to a different sensor of the plurality of sensors of the mobile device, wherein the plurality of sensors include a camera pointed in a front-facing direction towards the user's face, a screen capture device, and a touch sensor of a display of the mobile device;
   receiving, at the central controller, a second indicator of a stop of the session;
   combining the recorded data from the plurality of sensors into a session output that includes a video file comprising a plurality of video frames, the plurality of video frames associated with a plurality of timestamps, wherein data recorded from the camera includes images taken by the camera of the mobile device, and wherein combining the recorded data into the session output includes:
   writing the images taken by the camera to the plurality of video frames, the images associated with the plurality of timestamps; and
   after combining the recorded data from the plurality of sensors into the session output, sending the session output from the mobile device to a server computer.

2. The method of claim 1, further comprising:
   providing, by the mobile device, a task to the user, wherein the session occurs while the task is being performed.

3. The method of claim 2, wherein the task is provided to the user in response to an action performed in the mobile application by the user.

4. The method of claim 1, wherein data recorded from the screen capture device includes a plurality of screenshots of the display, and wherein combining the recorded data into the session output includes:
   writing the plurality of screenshots of the display to the plurality of video frames, the plurality of screenshots of the display associated with the plurality of timestamps.

5. The method of claim 4, wherein data recorded from the touch sensor of the display includes touch events conducted at the mobile device by the user, and
   wherein combining the recorded data into the session output further includes:
   placing visual indicators corresponding to the touch events conducted by the user on the plurality of screenshots of the display, the touch events associated with the plurality of timestamps.

6. The method of claim 1, wherein eye-tracking information is determined from the images.

7. The method of claim 1, wherein the plurality of sensors further include a microphone, wherein data recorded from the microphone includes audio data, and
   wherein combining the recorded data into the session output includes:
   synchronizing the audio data with the plurality of video frames based on the plurality of timestamps; and
   storing the synchronized audio data into the video file.

8. The method of claim 1, wherein data recorded from the screen capture device includes a plurality of screenshots of the display, and wherein combining the recorded data into the session output includes:
   writing the plurality of screenshots of the display to the plurality of video frames, the plurality of screenshots of the display associated with the plurality of timestamps; and
   writing the images taken by the camera to the plurality of video frames, the images associated with the plurality of timestamps.

9. The method of claim 1, wherein data recorded from the screen capture device includes a plurality of screenshots of the display, wherein data recorded from the touch sensor of the display includes touch events conducted by the user, and
   wherein combining the recorded data into the session output includes:
   placing visual indicators corresponding to the touch events conducted by the user on the plurality of screenshots of the display, the touch events associated with the plurality of timestamps;
   writing the plurality of screenshots of the display to the plurality of video frames, the plurality of screenshots of the display associated with the plurality of timestamps; and
   writing the images taken by the camera to the plurality of video frames, the images associated with the plurality of timestamps.

10. The method of claim 9, wherein, in the plurality of video frames, the plurality of screenshots of the display are partially overlaid with the images taken by the camera.

11. The method of claim 9, wherein, in the plurality of video frames, the plurality of screenshots of the display are rendered to be adjacent to the images taken by the camera.

12. A mobile device comprising:
   a plurality of sensors of the mobile device including:
   a camera pointed in a front-facing direction toward a user's face,
   a screen capture device, and
   a touch sensor of a display of the mobile device;
   one or more processors executing a mobile application that includes usability software, the usability software including a central controller and a plurality of recording functions; and
   a computer-readable medium coupled to the one or more processors, the computer-readable medium comprising code, executable by the one or more processors, for performing a method comprising:
   receiving, at the central controller, a first indicator of a start of a session for recording the user's interactions with the mobile application;
   sending, from the central controller to the plurality of recording functions, a command to begin recording;

recording, by the plurality of recording functions, data from the plurality of sensors of the mobile device, each recording function of the plurality of recording functions corresponding to a different sensor of the plurality of sensors of the mobile device;

receiving, at the central controller, a second indicator of a stop of the session;

combining the recorded data from the plurality of sensors into a session output that includes a video file comprising a plurality of video frames, the plurality of video frames associated with a plurality of timestamps, wherein data recorded from the camera includes images taken by the camera, and wherein combining the recorded data into the session output includes:

writing the images taken by the camera to the plurality of video frames, the images associated with the plurality of timestamps; and after combining the recorded data from the plurality of sensors into the session output, sending the session output from the mobile device to a server computer.

13. The mobile device of claim 12, further comprising:
providing, by the mobile device, a task to the user, wherein the session occurs while the task is being performed.

14. The mobile device of claim 13, wherein the task is provided to the user in response to an action performed in the mobile application by the user.

15. The mobile device of claim 12, wherein data recorded from the screen capture device includes a plurality of screenshots of the display, and wherein combining the recorded data into the session output includes:

writing the plurality of screenshots of the display to the plurality of video frames, the plurality of screenshots of the display associated with the plurality of timestamps.

16. The mobile device of claim 15, wherein data recorded from the touch sensor of the display includes touch events conducted at the mobile device by the user, and wherein combining the recorded data into the session output further includes:

placing visual indicators corresponding to the touch events conducted by the user on the plurality of screenshots of the display, the touch events associated with the plurality of timestamps.

17. The mobile device of claim 12, wherein eye-tracking information is determined from the images.

18. The mobile device of claim 12, wherein the plurality of sensors of the mobile device further include a microphone, wherein data recorded from the microphone includes audio data, and wherein combining the recorded data into the session output includes:

synchronizing the audio data with the plurality of video frames based on the plurality of timestamps; and storing the synchronized audio data into the video file.

* * * * *